March 19, 1957  A. J. MUTTI  2,785,916

ANTI-CRASH AUTO DOOR LOCK

Filed July 30, 1954

INVENTOR.
ADOLPH J. MUTTI
BY
Eugene C. Knoblock
ATTORNEY.

United States Patent Office 2,785,916
Patented Mar. 19, 1957

2,785,916

ANTI-CRASH AUTO DOOR LOCK

Adolph J. Mutti, German Township,
Marshall County, Ind.

Application July 30, 1954, Serial No. 446,909

3 Claims. (Cl. 292—144)

This invention relates to an automobile door lock and more particularly to a lock of this character which is adapted to be effective for the purpose of latching a door so that it may not spring open incident to a crash in the case of an accident.

Many fatalities occur as a result of automobile crashes, and studies are being made by both official and unofficial groups and organizations to secure information helpful in promoting safety and in formulating laws and regulations minimizing the likelihood of fatalities and for the purpose of dictating changes in the construction of motor cars to promote safety. One factor which has been determined by such investigations is that a very large percentage of the fatal accidents have been characterized by the fact that the person or persons who are killed have been thrown out of the automobile as a result of the accident. This appears to result from the fact that the body and the doors of the automobile are sprung incident to a crash, so that the doors are swung open, and the jar of the impact throws the passenger clear of the car through the open door. In only a very small percentage of fatal accidents have the persons who were killed stayed within the automobile or vehicle in which they were passengers. The statistics are so predominant on these points as to indicate that death may result from the fact that the person is thrown out of his car and might be avoided if means could be provided which were effective to hold a car door closed in the event of a crash.

It is the primary object of this invention to provide a device which will hold a car door closed effectively in the case of a crash and despite distortion or wracking of parts which might release the normal door latch of an automobile door.

A further object is to provide a device of this character having an elongated guide mounted within the interior of a door or other hollow part in the body of an automobile and slidably mounting a latch adapted to be projected through registering openings in confronting fixed and movable parts of an automobile body, and means to project the latch into said registering openings to prevent the opening of the door or to retract the same to facilitate opening and closing of the door at will.

Other objects will be apparent from the following specification.

Figure 1:
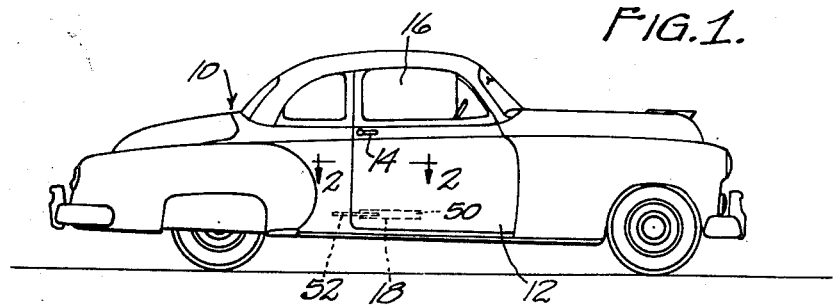
Fig. 1 is a side view of an automobile illustrating the location of my improved door latch in dotted lines.
Figure 2:
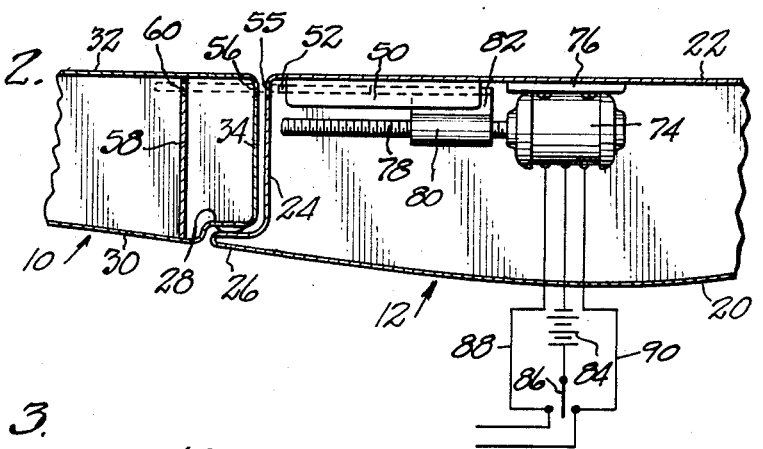
Fig. 2 is an enlarged fragmentary horizontal sectional view taken on line 2—2 of Fig. 1 and illustrating a portion of an automobile door and associated body part and of latch means for locking the automobile door in closed position.

Referring to the drawing which illustrates the preferred embodiment of the invention, and particularly to Figs. 1 and 2, the numeral 10 designates the body of an automobile provided with a door opening within which is mounted a door 12 suitably hinged at spaced points preferably along the front edge thereof (not shown), as viewed in Fig. 1. The door will mount a door latch operable by a handle 14 carried by the door or by latch mechanism associated with and adjacent to such a handle 14. Such latch mechanism is conventional and serves for all normal purposes to hold the door 12 in closed position until manipulation of the handle or associated mechanism releases the latch to permit the door to swing freely toward open position. It will be understood that the door latch may be of any type known and commonly used in the art.

The automobile door 12 commonly mounts a glass window pane 16 in the upper end portion thereof and suitable means are provided for raising and lowering the same, such means being well understood in the art and not being here illustrated. Such means require a certain part of the interior of the door for their reception and necessitate location of an anti-crash latch near the lower end of the door in a position substantially as illustrated in dotted lines at 18 in Fig. 1. The door itself is hollow and includes an outer side panel 20, an inner side panel 22, edge members 24 at its vertical edges, and the free opening edge of the door will preferably be provided with a lip portion 26 forming a continuation of the outer wall 20 beyond the plane of the upright wall 24, and adapted to overlap a portion of the body 10 recessed or inset at 28, so that the door is rendered weathertight, and a streamline or substantially continuous panel effect is provided between the outer door panel 20 and the outer panel 30 of the adjacent body portion. The body is preferably hollow and has an inner panel 32 and a cross-panel 34 outlining the door opening. The construction illustrated in Fig. 2 will be understood to represent the construction of a two-door sedan or coupe model as illustrated in Fig. 1, and will be understood to be illustrative and is not intended to be limiting. Thus, in four-door automobile models having two doors at each side thereof, the body may be provided with a center post 36 located between a front door 38 and a rear door 40. Where posts 36 are provided, each will preferably have a hollow construction characterized by an inner wall portion 42, an outer wall portion 44 recessed at 46 at its forward and rearward portions, and front and back crosswalls 48 which confront the end walls 24 of the front and rear doors, as seen in Fig. 3.

Figure 4:
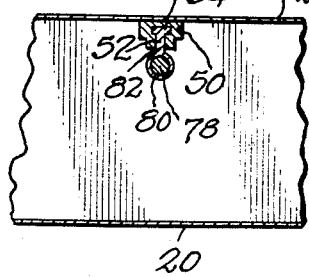
Fig. 4 is a fragmentary sectional view taken on line 4—4 of Fig. 3.

My improved anti-crash latch includes a latching bolt, a guide therefor, and means to project and retract the bolt. The guide may be carried by the door or may be located in the hollow portion of an automobile body and will serve to guide projection of the bolt through apertures in the body and in the door to extended latching position. Referring to Fig. 2, the guide member 50 is shown as being elongated and as extending substantially horizontally. The guide member 50 will preferably constitute a channel and will have substantial strength, as by formation thereof from a bar in which a groove is cut, or from a stamping of metal of heavy gauge, or from a forging or the like. As best seen in Fig. 4, the groove in the guide 50 may be of T-shape in cross-section. One end of the guide 50 will preferably be located adjacent to the end wall 24 in the case shown where the guide is mounted within the door 12, for purposes to be mentioned hereinafter. An elongated lock bar 52, preferably of a length greater than the length of the guide 50 and of a cross-sectional configuration substantially conforming to the cross-sectional shape of the groove in the guide 50, is freely slidable in that groove. Thus, as illustrated in Fig. 4, if the slot in the guide 50 is of T-shape, the locking bar 52 will include a portion 54 fitting within the cross head of the T-slot, and serving to anchor the locking bar 52 in the guide 50 against displacement in a direction laterally of the guide, although accommodating freedom of movement of the bolt 52 lengthwise of the guide. The locking bar 52 is strong and preferably substantially rigid and is formed of a material having tensile strength so that it may withstand impact and stress without fracturing.

Apertures are provided in the parts of the door and the body aligned with the locking bar 52 to receive the same. Thus, in the construction shown in Fig. 2, an aperture 55 is formed in the end wall 24 of the door, and an aperture 56 is formed in the body part 34 defining the door opening. The two apertures 55 and 56 are aligned with the sliding bolt and receive the same snugly but slidably when the door is closed and the bolt is projected from the full line position shown in Fig. 2. If desired, the auto body may be provided with a transverse reinforcing member 58 adjacent to but spaced from the member 34, and this member may have an aperture 60 formed therein aligned with the apertures 55 and 56, so that the bolt 52 may be extended to the dotted line position to have two points of support at each of the door and the body. The two points of support at the door would consist of the support at the guide 50 and at the aperture 55. The two points of support in the automobile body would constitute the apertures 56 and 60. By such an arrangement positive assurance can be provided that the door will not swing open upon impact incident to a crash, and thus will protect the occupants of the automobile against the hazard of being thrown from the automobile incident to the crash.

Figure 3:
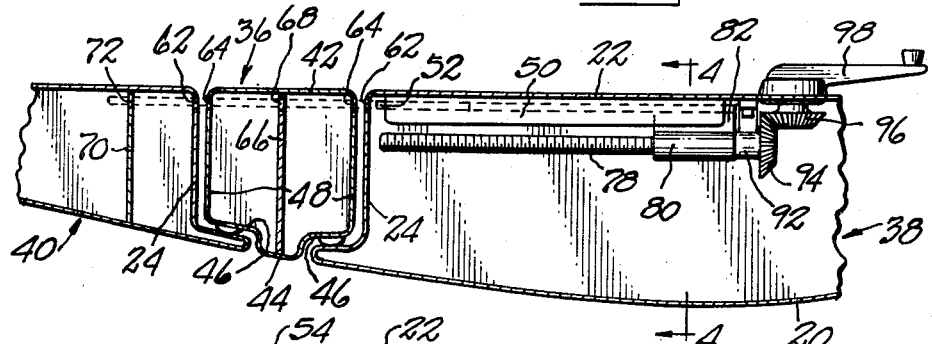
Fig. 3 is an enlarged horizontal fragmentary sectional view similar to Fig. 2, but illustrating a modified embodiment of the invention.

The construction of a car having four doors is illustrated in Fig. 3. The end wall 24 of the door 38 will be provided with an aperture 62, and a similar aperture 62 will be formed in the end wall 24 of the door 40. Apertures 64 will be formed in the walls 48 of the post 36, and this post will preferably be reinforced by a transverse member 66 having an aperture 68 formed therein. The door 40 may also include a transverse reinforcing member 70 having an aperture 72. Each of the apertures 62, 64, 68 and 72 are aligned with each other and with the locking bolt 52 slidable in the guide 50. Extension of the locking bolt 52 from the full line position shown in Fig. 3 retracted completely within the door 38 to a position extending through the apertures 62, 64, 68 and 72 as illustrated in dotted lines, effects a locking of both of the doors 38 and 40. In this instance the locking bolt or bar 52 is supported with reference to the door 38 by the guide 50 and the aperture 62, and with reference to the door 40 by the apertures 62 and 72. Effective protection of the position of the doors relative to the body is provided by extension of the bolt through the three apertures 64 and 68. Consequently, in extended position the single bolt 52 effectively holds both doors 38 and 40 closed incident to impact or crash.

Suitable means are provided for projecting and retracting the bolt 52. In Fig. 2 a reversible electric motor 74 is illustrated as being mounted with its axis positioned horizontally and being secured by means of its base 76 or other supporting structure to the door structure as at the door panel 22. A shaft 78 of the motor is elongated and projects therefrom parallel to the guide 50 and adjacent said guide. The shaft 78 is screw-threaded and an elongated sleeve member 80 having an internally screw-threaded bore is screw-threaded upon the shaft 78. A web or plate 82 is carried by and projects from the sleeve 80 to pass through the mouth of the guide channel 50 and has connection with the inner end of the bolt 52. The motor 74 is connected in an electric circuit with the battery 84, said circuit having a control switch 86 for selectively throwing in circuit either of the two motor leads 88 and 90 for determining the direction in which the motor 74 will rotate. The switch 84 may be located at any convenient place, as at the instrument panel, so that the device may be conveniently operated. It will be understood that the single switch 86 may control two or more bolt-positioning motors 84, so that all doors will be latched simultaneously when the switch 86 is actuated.

The bolt-advancing and retracting means illustrated in Fig. 3 is actuated manually and consists of the elongated screw-threaded shaft 78 extending parallel to and adjacent to the guide 50 and having the internally screw-threaded sleeve 80 threaded thereon and connected by the plate or web 82 with the bolt 52, as in the preferred construction. In this instance the screw-threaded shaft 78 is journalled in suitable bearings 92 carried by the door and will mount a bevel gear 94 at one end thereof meshing with a bevel gear 96 mounted on a shaft carrying the crank 98 projecting externally of the door at the inner face thereof, that is, being located within the interior of the automobile body.

This device serves very effectively its intended purpose by reason of the fact that the bolt 52 in each case is of sufficient length that it extends substantially into each door and cannot be released by springing or wracking of the door or the body alone, as is true in connection with conventional door locks provided as standard equipment upon automobiles at the present time. Instead, it is quite apparent that a door can be released only if a bolt 52 fractured, and the bolts can be constructed of sufficiently heavy material to substantially preclude such action. The reinforcement of the parts, as by the use of reinforcing members 58, 66 and 70, strengthen the parts of the body and the doors which are apertured to receive the locking bolt when projected, and thus reduce the possibility of fracture or tearing of the metal forming the body to such an extent as to permit release of the door.

In illustrating and describing this invention, reference has been made in each instance to an arrangement in which the guide for the locking bolt and the mechanism for operating the locking bolt is housed within a door. It will be understood that this is illustrative and not intended to be limiting, and that the invention may be employed in instances in which the bolt guide and associated parts are located within a portion of the hollow body and are projected through locking openings to extend into the door for locking purposes.

In the embodiment of the invention utilizing an electric motor to advance and retract the locking bolt, various arrangements of the operating switch may be employed. One such arrangement is to subject the device to the selective control of either of two switches. One of these switches can be located at the dash or at any other readily accessible place, and the other of the switches can be associated with the door latch of conventional door lock so as to energize the motor to operate the lock whenever a key is turned in the door lock associated with the door handle 14. The latter arrangement is particularly desirable as a means to prevent tampering with an unauthorized entry into an automobile. In other words, this arrangement permits the anti-crash lock to supplement the normal door lock when the door lock is locked, and, consequently, the car is rendered substantially theft-proof.

While the preferred embodiments of the invention have been illustrated and described, it will be understood that changes in the construction may be made within the scope of the appended claims without departing from the spirit of the invention.

I claim:

1. A locking device for use in locking a door of an automotive vehicle, comprising an elongated guide member having a longitudinal guide groove, an elongated locking bolt slidable longitudinally in said guide groove between an extended locking position and a retracted door-releasing position, and means for selectively extending and retracting said locking bolt, including an elongated rotatable screw-threaded shaft extending parallel to said guide groove, a member screw-threaded on said shaft and connected to said locking bolt and means for rotating said shaft.

2. A locking device for use in locking a door of an automotive vehicle, comprising an elongated guide member having a longitudinal guide groove, an elongated locking bolt slidable longitudinally in said guide groove between an extended position projecting from the end of said guide and a retracted door-releasing position substantially confined in said guide, and means for selectively extending and retracting said locking bolt, and including a reversible power driven actuator having a driving connection with said bolt, and a controller for said actuator.

3. A locking device for use in locking a door of an automotive vehicle, comprising an elongated guide member having a longitudinal guide groove, an elongated locking bolt slidable longitudinally in said guide groove between an extended position projecting from one end of said guide and a retracted position within said guide, and means for selectively extending and retracting said locking bolt, including a reversible electric motor having an elongated screw-threaded shaft parallel to said guide groove, and a screw-threaded member carried by said locking bolt and screw-threaded on said shaft.

References Cited in the file of this patent

UNITED STATES PATENTS

| | | |
|---|---|---|
| 1,154,439 | Scholfield et al. | Sept. 21, 1915 |
| 2,438,238 | Tonkin | Mar. 23, 1948 |
| 2,472,915 | Miller | June 14, 1949 |